UNITED STATES PATENT OFFICE.

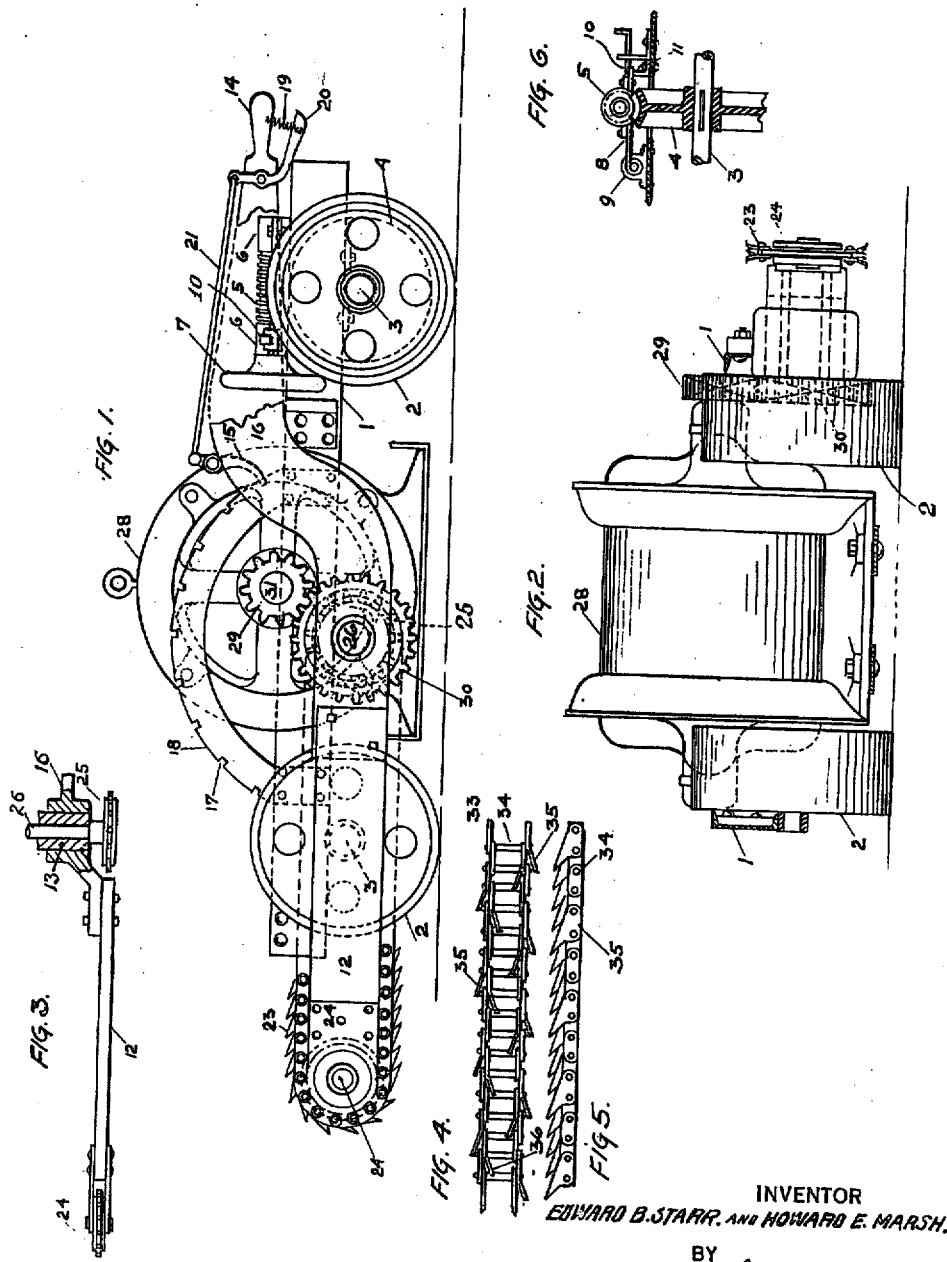

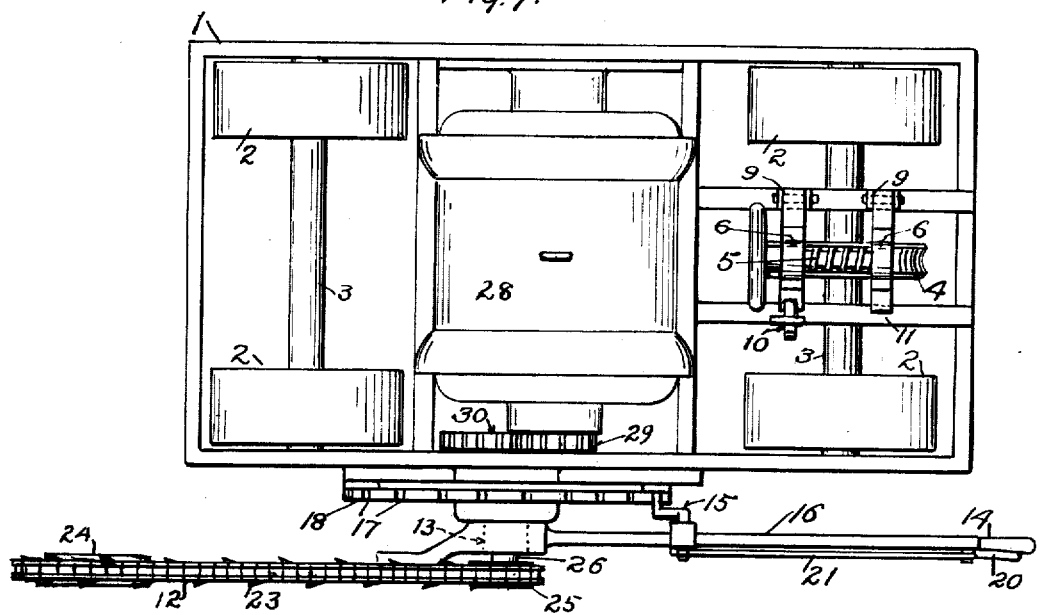

EDWARD B. STARR AND HOWARD E. MARSH, OF LOMPOC, CALIFORNIA.

APPARATUS FOR SAWING NATURAL DEPOSITS.

1,422,386.      Specification of Letters Patent.      Patented July 11, 1922.

Application filed February 26, 1920. Serial No. 361,377.

*To all whom it may concern:*

Be it known that we, EDWARD B. STARR and HOWARD E. MARSH, citizens of the United States, residing at Lompoc, in the county of Santa Barbara and State of California, have invented a new and useful Apparatus for Sawing Natural Deposits, of which the following is a specification.

This invention relates to means for sawing or cutting grooves or kerfs in banks or natural deposits of kieselguhr, or similar material, which is sufficienty soft to be cut by means hereinafter described.

The main object of the present invention is to provide means for this purpose which will be capable of cutting rapidly through a large angle of cut and of being conveniently and rapidly placed and held in position for cutting.

The accompanying drawings illustrate our invention, and referring thereto:

Fig. 1 is a side elevation of the apparatus;

Fig. 2 is an end elevation thereof taken at the left end of Fig. 1;

Fig. 3 is a plan view of the cutter bar;

Fig. 4 is a plan view of a portion of the cutter or saw chain;

Fig. 5 is a side elevation thereof;

Fig. 6 is a vertical section showing the disengaged driving means for the cutter truck of the apparatus.

Fig. 7 is a plan view of the apparatus.

The apparatus comprises a truck frame 1 mounted on truck wheels 2 adapted to travel over the surface of the quarry adjacent to the bank to be cut, for example, on top of said bank. The shafts 3 of said truck wheels are journaled in suitable manner on truck frame 1 and one of said shafts is preferably provided with manually operated driving means of such construction as to enable the truck to be brought accurately to proper position and held therein but to be releasable to enable the truck to be pushed easily back and forth. For this purpose, a worm wheel 4 may be provided in said shaft 3 engaged by a worm 5 journaled in bearings 6 carried by a vertically swinging frame 8, which is pivotally mounted at 9, so as to enable the worm to be lifted out of the engaging position and thrown over to one side so as to leave the worm wheel free to turn; or to enable the frame 8 to be lowered against a stop 11, so as to bring the worm into engagement with the worm wheel, as shown in Fig. 6, a suitable bolt or locking means 10 being provided for locking the frame 8 down in this position.

A cutter bar 12 is pivotally mounted by a bearing 13 on the frame 1 so as to swing vertically on said frame, said cutter bar having a rearward extension 16 on the opposite side of said shaft from said cutter bar, said rearward extension being provided with an operating handle 14 whereby the cutter bar may be swung through any desired angle. Said rearward extension 16 serves, to some extent, as a counterbalance for the cutter bar and constitutes a lever for operating the same on the bearing 13 as a fulcrum. Suitable means is provided for locking the cutter bar in desired position, said means consisting, for example, of a dog 15 pivotally mounted on the rearward extension of said cutter bar carrying the handle 14, said dog 15 engaging any one of a series of notches 17 on an arc member 18 secured to the frame 1, and said dog being normally held in engaging position by a spring 19 extending between the handle 14 and a grip member 20, said grip member being pivoted to said extension 16 of the cutter bar and connected to the dog 15 by rod 21. By simultaneously grasping the handle 14 and the grip member 20 the dog may be released from the arc member 18 in obvious manner. A cutter or saw chain 23 extends over a sprocket wheel 24 journaled at the outer end of the cutter bar 12, and over a sprocket wheel 25 carried by a shaft 26, which extends axially within the pivotal bearing 13 for the cutter bar, so as to provide a driving connection for the carrier chain in all positions thereof. Said shaft 26 may be operated by any suitable driving means or motor 28, which may be an electric motor, gas engine, or steam engine, or other suitable power device, said motor being connected to the shaft in any suitable manner, for example, by gears 29 and 30, respectively mounted on the shaft 31 of the motor and on the shaft 26.

The cutter or saw chain 23 may be of any suitable construction comprising, for example, a series of links 33 connected by pins 34, certain of said links being provided with projecting cutters or saw-teeth 35 and 36 set in opposite directions to provide necessary clearance.

The operation is as follows:

The machine is brought into proper position, for example, adjacent to a vertical face of the bank to be cut, so that the forward extending cutter bar extends over the top of said face, the motor 28 is then set in operation and the cutter bar is swung downwardly and rearwardly by the handle 14 so as to cause the cutter or saw chain to saw a vertical kerf or groove in the bank to any desired depth depending on the extent of movement of the cutter bar. In this operation the cutter bar is brought accurately to correct position by moving it in either direction by means of the manually operating device 7 and, if desired, said device may be further operated to cause the machine to travel during the movement of the saw so as to extend the saw cut horizontally in the direction of travel. When the machine is to be moved from place to place, for example, in moving it to form another cut the manual operating means is released or disconnected from the truck wheel shaft 3, as above described, so as to enable free movement of the truck.

What we claim is:

1. An apparatus for sawing natural deposits, comprising a truck frame provided with truck wheels, operating means releasably connected with certain of the truck wheels to operate the truck in either direction, and to hold the same in operated position, a cutter bar pivotally mounted on the truck frame to swing vertically thereon and having a rearward extension on the opposite side of its pivotal mounting, provided with an operating handle and serving as an operating lever and counterbalance for the cutter bar, said rearward extension being provided with means for holding said cutter bar in angularly adjusted position, a cutter chain mounted to move on said cutter bar, and driving means for said cutter chain.

2. In an apparatus for sawing natural deposits, a truck provided with a frame and with truck wheels on which said frame is mounted, a cutter bar pivotally mounted on said frame to swing vertically thereon, a driving shaft journaled co-axially with the pivot of said cutter bar, a sprocket wheel carried by said shaft, a sprocket wheel journaled at the outer end of said cutter bar, a saw chain traveling over said sprocket wheels and a motor geared to said shaft of said first named sprocket wheel to operate the saw chain, said cutter bar having a rearward extension on the opposite side of its pivotal mounting and constituting an operating lever for the cutter bar and provided with an operating handle and with means for locking it in adjusted position and releasable means for locking said truck in stationary position and for operating said truck in either direction.

3. In an apparatus for sawing natural deposits a supporting means, a cutter bar pivotally mounted on said supporting means and having a rearward extension on the opposite side of its pivotal mounting and serving as a lever for operating said cutter bar and provided with a handle and with means for locking the cutter bar in adjusted position, a cutter chain carried by and movably mounted on said cutter bar, and means for driving said cutter chain.

In testimony whereof we have hereunto subscribed our names this 10th day of February, 1920.

E. B. STARR.
HOWARD E. MARSH.